US008625767B2

(12) United States Patent
Byrne et al.

(10) Patent No.: US 8,625,767 B2
(45) Date of Patent: Jan. 7, 2014

(54) CONFERENCE BRIDGE AUDIO QUALITY DIAGNOSTIC AND SELF CONFIGURATION SYSTEM AND METHOD

(75) Inventors: Joe Byrne, Dublin (IE); Sean Duddy, Dublin (IE); Gerard O'Sullivan, Dublin (IE)

(73) Assignee: Avaya Inc., Basking Ridge, NJ (US)

(*) Notice: Subject to any disclaimer, the term of this patent is extended or adjusted under 35 U.S.C. 154(b) by 294 days.

(21) Appl. No.: 12/894,478

(22) Filed: Sep. 30, 2010

(65) Prior Publication Data
US 2012/0082304 A1    Apr. 5, 2012

(51) Int. Cl.
*H04M 3/42* (2006.01)
(52) U.S. Cl.
USPC .................... 379/202.01; 379/158
(58) Field of Classification Search
USPC .......... 379/202.01, 158, 201.01, 204.01, 379/205.01, 206.01, 207.01
See application file for complete search history.

(56) References Cited

U.S. PATENT DOCUMENTS

| | | | | |
|---|---|---|---|---|
| 5,825,858 A * | 10/1998 | Shaffer et al. | ................ | 379/120 |
| 5,907,324 A * | 5/1999 | Larson et al. | ................ | 715/753 |
| 5,909,543 A * | 6/1999 | Tanaka et al. | ................ | 709/204 |
| 6,148,335 A * | 11/2000 | Haggard et al. | ............... | 709/224 |
| 6,850,496 B1 * | 2/2005 | Knappe et al. | ................ | 370/260 |
| 2008/0072159 A1* | 3/2008 | Cockerton | .................... | 715/756 |
| 2009/0319913 A1* | 12/2009 | Serr et al. | ...................... | 715/753 |
| 2010/0080374 A1 | 4/2010 | Hepworth et al. | | |
| 2011/0225247 A1* | 9/2011 | Anantharaman et al. | ..... | 709/206 |

* cited by examiner

*Primary Examiner* — William Deane, Jr.
(74) *Attorney, Agent, or Firm* — Sheridan Ross P.C.

(57) ABSTRACT

A conference diagnosis system can correlate information about a current teleconference with information about past conferences to make an intelligent assessment as to the potential cause of a poor audio or other condition. A conference bridge conducting the conference can then change various configuration settings on the conference bridge to resolve the problem. A running average of the results of past adjustments can be measured and direct future configuration changes. Thus, past successful adjustments can provide a starting point for changes to a new conference and real-time digital signal processing (DSP) adjustments can help tailor changes to the specific conference.

20 Claims, 8 Drawing Sheets

CONFERENCE BRIDGE AUDIO QUALITY DIAGNOSTIC AND SELF CONFIGURATION SYSTEM AND METHOD

BACKGROUND

Many organizations use teleconferences to communicate information between parts of the organization. A common problem experienced with teleconferences is poor audio quality. Determining the causes of poor audio quality during a teleconference can be difficult. Further, the audio quality problems can also be difficult to troubleshoot after the teleconference because the problem may not persist. Often, the problems in the teleconference are due to the configuration of the surrounding network environment or the end user's system or configuration.

Teleconferences are often conducted with a system called a conference bridge. Conference bridges may be manually reconfigured during a conference, but this method to address audio quality problems is haphazard and laborious. Further, if the conference bridge is not the problem, it may be difficult to determine what other system is the cause of the problem. The conference participants may attempt to adjust the teleconference by muting some participants or setting a mode in the teleconference to better optimize the conference's performance. However, these user-made adjustments can embarrass participants or lead to wasted time as the conference is adjusted rather than participated in.

SUMMARY

There is no current solution that allows for a conference bridge to self-analyze historical statistics and identify the cause of poor audio in conferences and self-configure to work around the problem. Analyzed data can include network delay, packet loss, jitter buffer statistics, etc. If the problem cannot be resolved by self-configuration, the conference bridge may be able to send an alert to the system administrator to have manual help in fixing the problem.

The embodiments presented herein provide an automated system for recording, providing, or acting on quality measures and/or configuration information in a conference. A conference bridge can record quality and configuration for a conference in a historical data database. Upon receiving a complaint or information about a quality problem in a subsequent conference, the conference bridge can access the historical information to help diagnose or automatically correct the quality issue.

This idea proposes a conference diagnosis system which can correlate available information about the conference and/or past conferences and make an intelligent assessment as to the potential cause of a poor audio condition. The conference bridge can then change various configuration settings on the conference bridge to resolve the problem. A running average of the results of past adjustments can be measured and direct configuration changes. Thus, past successful adjustments can provide a starting point for changes to a new conference and real-time digital signal processing (DSP) adjustments can help tailor changes to the specific conference.

This automated system can alleviate an administrator from making manual adjustments. The aim of the system is to use past information to resolve issues that are caused by a configuration of the conference bridge itself or by a configuration of the surrounding network infrastructure. Quality changes (whether improvements or degradations) associated with subsequent adjustments to a conference call can be measured and taken into account. In effect, the conference bridge may intelligently adapt to the environment in which the conference bridge is deployed.

Statistics used to diagnose the problem will include network delay, packet loss, jitter buffer statistics, time of day, average load, current load, processor load, memory usage, and the like. Additionally, neural networks could be used by the conference bridge to "learn" over time how to better solve such problems within the specific environment that it is deployed in.

The term "conference" as used herein refers to any communication session, whether including audio, video, text, or other multimedia data, between two or more communication endpoints and/or users. Typically, a conference includes three or more communication endpoints and/or users.

The term "communication device" or "communication endpoint" as used herein refers to any hardware device and/or software operable to engage in a communication session. For example, a communication device can be an IP-enabled phone, a desktop phone, a cellular phone, a personal digital assistant, a soft-client telephone program executing on a computer system, etc. In embodiments, the communication endpoint is a computer system as described in conjunction with FIGS. 7 and 8.

The term "conference bridge" as used herein refers to any hardware, software, or a combination of hardware and software operable to conduct, manage, execute, or otherwise hold a conference between two or more communication endpoints and/or one or more other conference bridges. In embodiments, the conference bridge is a server or computer system as described in conjunction with FIGS. 6 and 7.

The term "conference engine" as used herein refers to a module executed by a conference bridge to establish and conduct a conference.

The term "quality measure" as used herein refers to any measure of the signal quality or performance of a conference.

The term "configuration parameter" or "configuration characteristic" as used herein refers to any characteristic of a configuration of a conference. The characteristic can refer to any type, set-up, configuration of, performance parameter, etc. of any component, system, machine, hardware, and/or software used within a transmission path of a conference between one or more communication endpoints and one or more conference bridges or between two or more conference bridges.

The term "private branch exchange (PBX)" as used herein refers to any private branch exchange as known in the art.

The term "gateway" as used herein refers to any hardware and/or software that facilitate communications between two networks, such as, a LAN and the Internet.

The term "network" as used herein refers to a system used by one or more users to communicate. The network can consist of one or more session managers, feature servers, communication endpoints, etc. that allow communications, whether voice or data, between two users. A network can be any network or communication system as described in conjunction with FIG. 7 and FIG. 8. Generally, a network can be a local area network (LAN), a wide area network (WAN), a wireless LAN, a wireless WAN, the Internet, etc. that receives and transmits messages or data between devices. A network may communicate in any format or protocol known in the art, such as, transmission control protocol/internet protocol (TCP/IP), 802.11g, 802.11n, Bluetooth, or other formats or protocols.

The term "database" or "data model" as used herein refers to any system, hardware, software, memory, storage device, firmware, component, etc., that stores data. The data model can be any type of database or storage framework described in conjunction with FIGS. 6 and 7, which is stored on any type of non-transitory, tangible computer readable medium. The data model can include one or more data structures, which may comprise one or more sections that store an item of data. A section may include, depending on the type of data structure, an attribute of an object, a data field, or other types of sections included in one or more types of data structures. The data model can represent any type of database, for example, relational databases, flat file databases, object-oriented databases, or other types of databases. Further, the data structures can be stored in memory or memory structures that may be used in either run-time applications or in initializing a communication.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, embodiments are considered to include a tangible, non-transitory storage medium and prior art-recognized equivalents and successor media, in which the software implementations of the embodiments are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the embodiments are described in terms of exemplary embodiments, individual aspects of the embodiments can be separately claimed.

BRIEF DESCRIPTION OF THE DRAWINGS

The present disclosure is described in conjunction with the appended Figs..

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
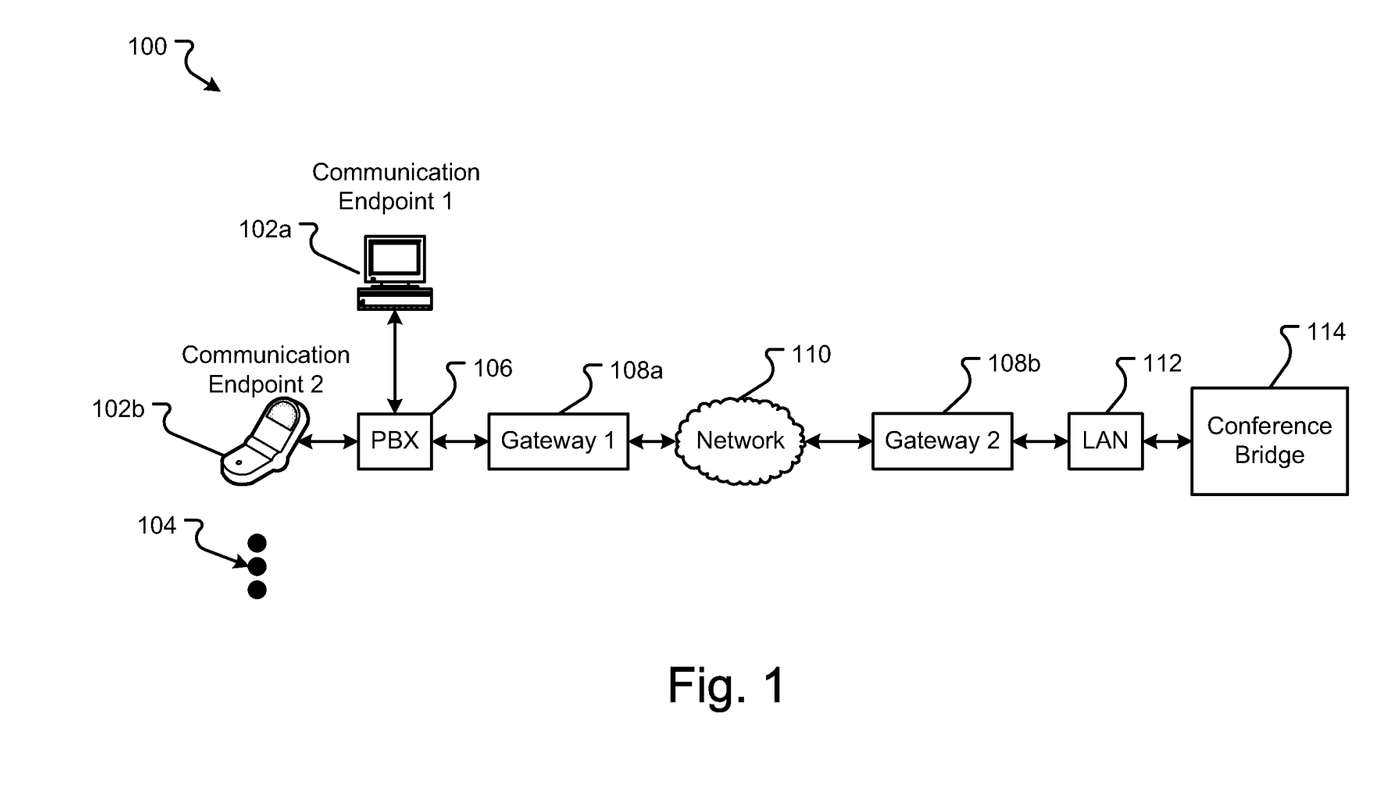
FIG. 1 is a block diagram of an embodiment of a system for conducting a conference.

A system 100 for conducting a conference is shown in FIG. 1. The system 100 can conduct a conference using one of several configurations. The configuration shown in FIG. 1 is only one example of the several configurations, but the configuration in FIG. 1 will be used to explain the systems and methods described hereinafter. The system 100 may be conducting a conference between two communication endpoints, 102a and 102b, with a single conference bridge 114. The conference can include two or more conference bridges and more or fewer communication endpoints 102 than those shown in FIG. 1, as represented by ellipses 104.

To configure the conference, the communication endpoints 102 may communicate through a PBX 106 to the conference bridge 114. The PBX 106 can be any PBX as known in the art to establish or allow communications for one or more communication endpoints 102. The PBX 106 may communicate with the first gateway 108a. Similar to the PBX 106, the gateway 108a can be any gateway as known in the art to establish communications through or into a network 110. The network 110 can be any network known in the art that allows communications associated with the conference.

Communications from the network 110 can be received at a second gateway 108b that is associated with the conference bridge 114. The second gateway 108b can be similar to the first gateway 108a and operable to receive or send data and communications through the network 110. The gateway 108b can be in communication with another network 112, such as a LAN, which then can interface or communicate with the conference bridge 114. The system components (e.g., PBX 106, gateway 1 108a, network 110, gateway 2 108b and/or LAN 112) show one type of configuration for a conference, but other configurations are possible and contemplated.

Figure 2:
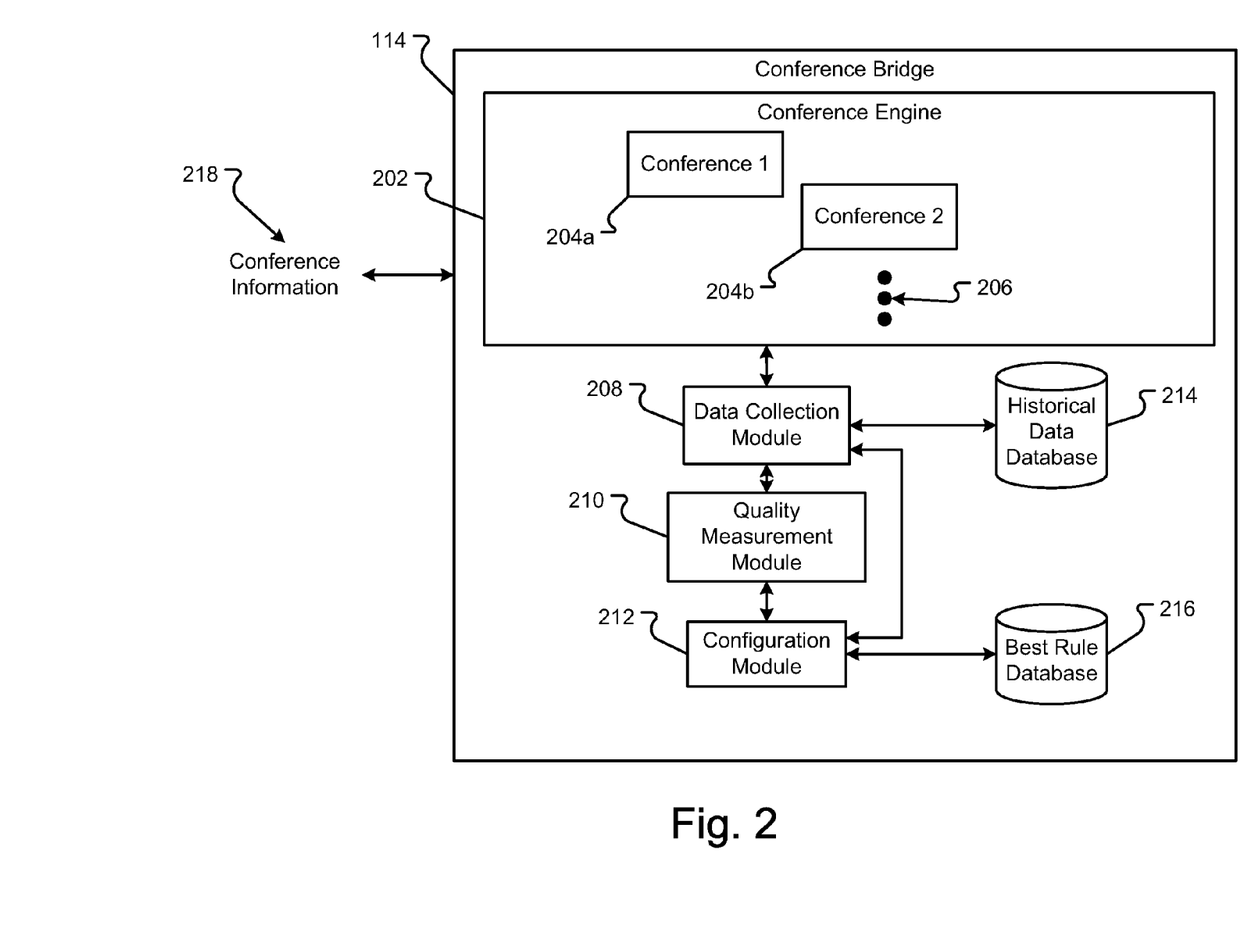
FIG. 2 is a block diagram of an embodiment of a conference bridge operable to conduct a conference.

An embodiment of a conference bridge 114 is shown in FIG. 2. The conference bridge 114 can include one or more modules, which may be hardware, software, or a combination of hardware and software. For ease of description, the modules will be described as being software components that are in communication with each other to send and receive data amongst the different modules.

The conference bridge 114 can include a conference engine 202. The conference engine 202 is operable to establish and conduct one or more conferences, for example, conference 1 204a and conference 2 204b. The conference engine 202 is operable to conduct more or fewer conferences than those shown in FIG. 2, as represented by ellipses 206. The conference engine 202 can conglomerate the communications from the two or more communication endpoints 102 into the conference 204 for provision to all endpoints 102. Thus, the conference engine 202 can receive conference information 218 and broadcast the conference information 218 to the other participants in the conference 204.

The conference engine 202 also can be in communication with one or more other modules, such as a data collection module 208, quality measurement module 210, and/or configuration model 212. The data collection module 208 can monitor the one or more ongoing conferences 204 to determine the audio quality of the signals being received and sent by the conference engine 202. The data collection module 208 can measure data associated with the conferences 204 to determine one or more quality measures as will be described in conjunction with FIGS. 3A-3C. Thus, as the conference 204 is ongoing the quality measures may be recorded and stored in a historical data database 214. Further, the data collection module 208 may also collect information about the configuration of the conference 204. Thus, the data collection module 208 can collect information about the different configuration characteristics as described in conjunction with FIGS. 3A-3C. The conference information may also be stored in the historical data database 214 with the quality characteristics. As such, the data collection module 208 is operable to provide data and other types of information for diagnosing problems in conferences 204 or in optimizing the configuration of conferences.

Figure 7:
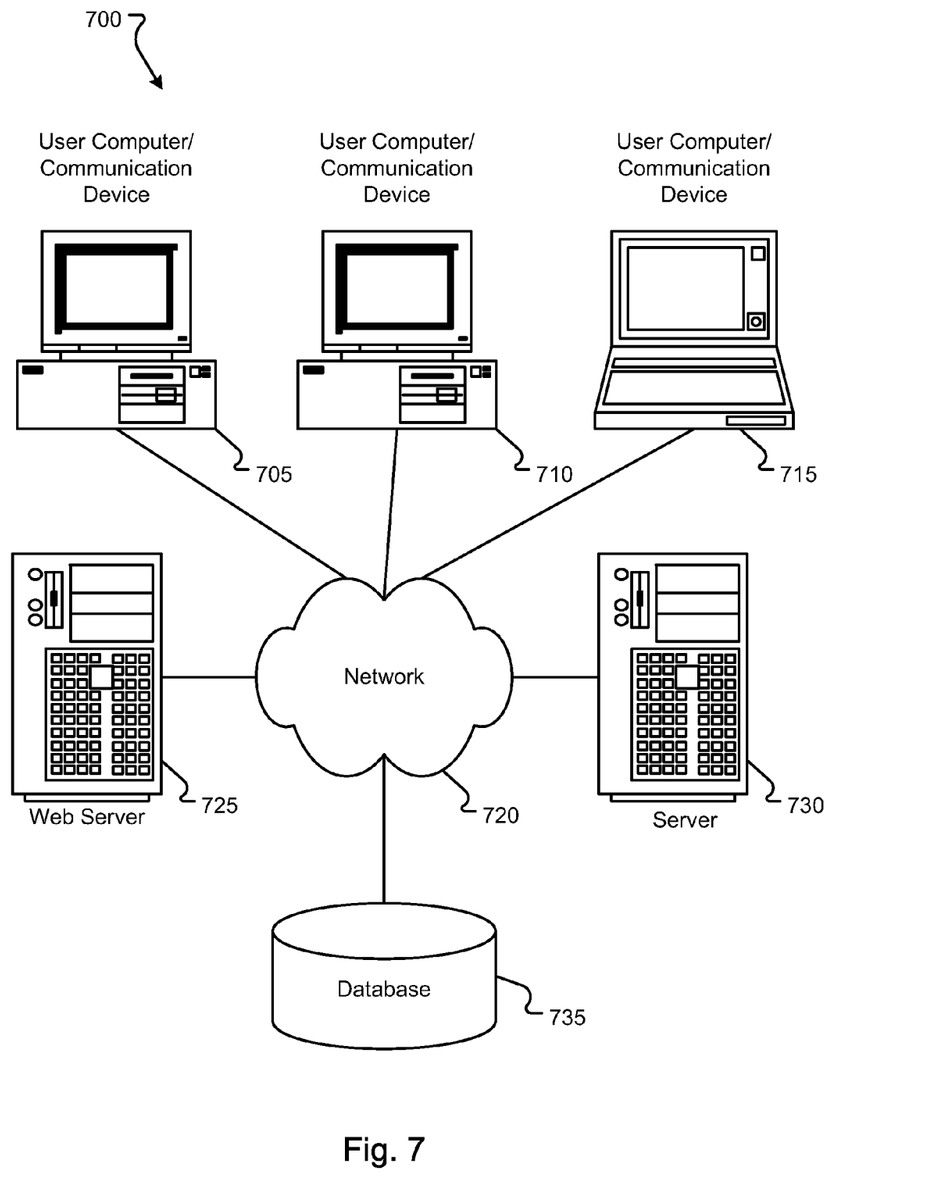
FIG. 7 is a block diagram of an embodiment of a computing environment operable to execute the embodiments described herein.
Figure 8:
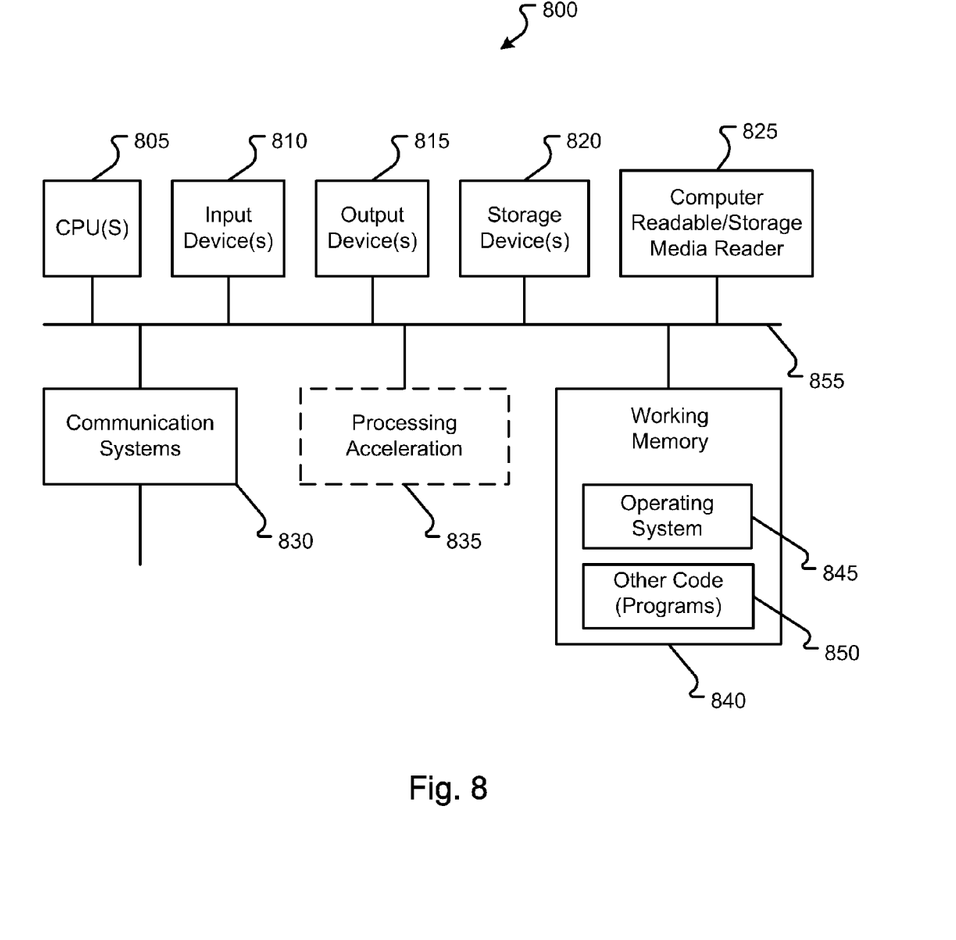
FIG. 8 is a block diagram of an embodiment of a computer or computing system environment operable to execute as the one or more devices described herein.

The historical data database 214 can be any database or data store as described in conjunction with FIGS. 7 and 8. The historical data database 214 can store information regarding conferences 204 and provide that information in the future or in real-time to help insure that the conferences 204 are conducted in the best manner and have optimized audio quality.

A quality measurement module 210 may collect quality measurement data for the data collection module 208. Thus, the quality measurement module 210 can determine the characteristics for each conference and provide that information to the data collection module 208. The quality measurement module 210 can measure the quality characteristics as described in conjunction with FIGS. 3A-3C.

The configuration module 212 is operable to provide configuration information to the data collection module 208. Thus, the configuration module 212 can determine the characteristics of the configuration, as shown in FIG. 1, and as described in conjunction with FIGS. 3A-3C. The data collection module 208 can receive the information from the configuration module 212 to store in the historical data database 214. In other embodiments, configuration module 212 can also change or adjust a configuration of a conference 204 during the conference. For example, the configuration module 212 can receive a signal from the data collection module 208 or the quality measurement module 210 that indicates that there is a quality issue with the conference 204. The configuration module 212 may then access a best rules database 216 to determine how to adjust the conference configuration settings to improve the quality characteristics or to eliminate the problem experienced during the conference 204.

The configuration module 212 may also pre-configure a conference 204 based on historical information and upon receiving a conference request. Thus, the configuration module 212 can request historical information from the data collection module 208. The configuration module 212 attempts to match the components provide d or configuration requested in the current conference request with successful configurations in the historical information. Based on the historical information, the configuration module 212 can instruct the conference engine 202 to configure the conference in a pre-determined manner to insure the best quality audio and/or video signal for the conference.

The best rules database 216 can be any database as described in conjunction with FIGS. 7 and 8. The best rules database 216 can store information on how to pre-configure or reconfigure a conference 204 based on historical information. The best rules database 216 can include one or more algorithms on how to adjust the configuration of a conference as will be described hereinafter.

Figure 3A:
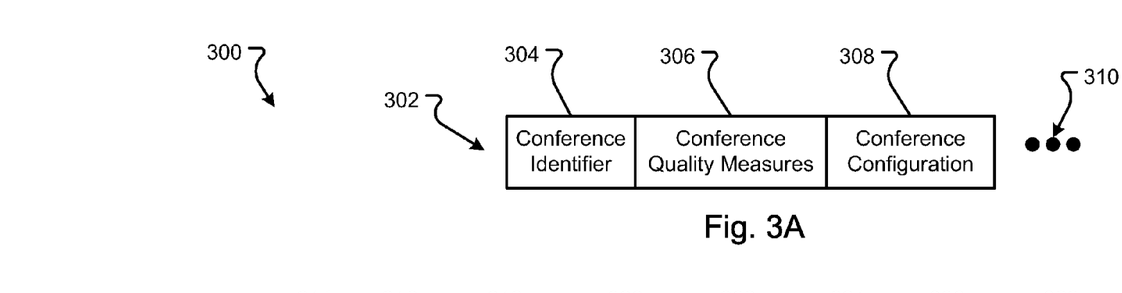
FIGS. 3A-3C are embodiments of data structures operable to store information about quality measures and configuration parameters for one or more conferences.
Figure 3B:
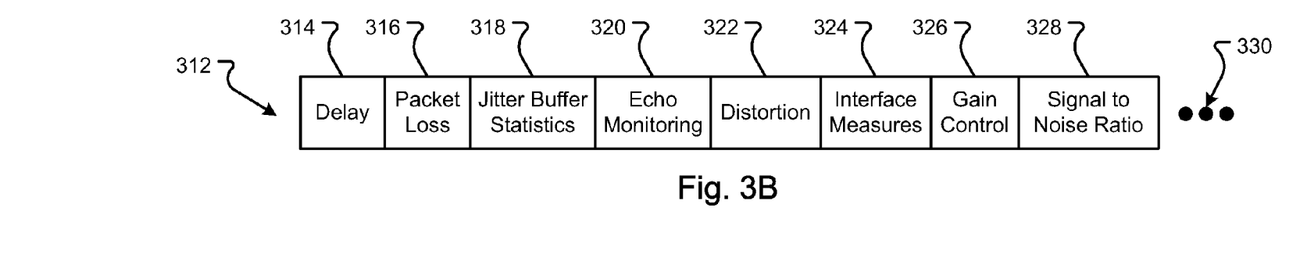
Figure 3C:
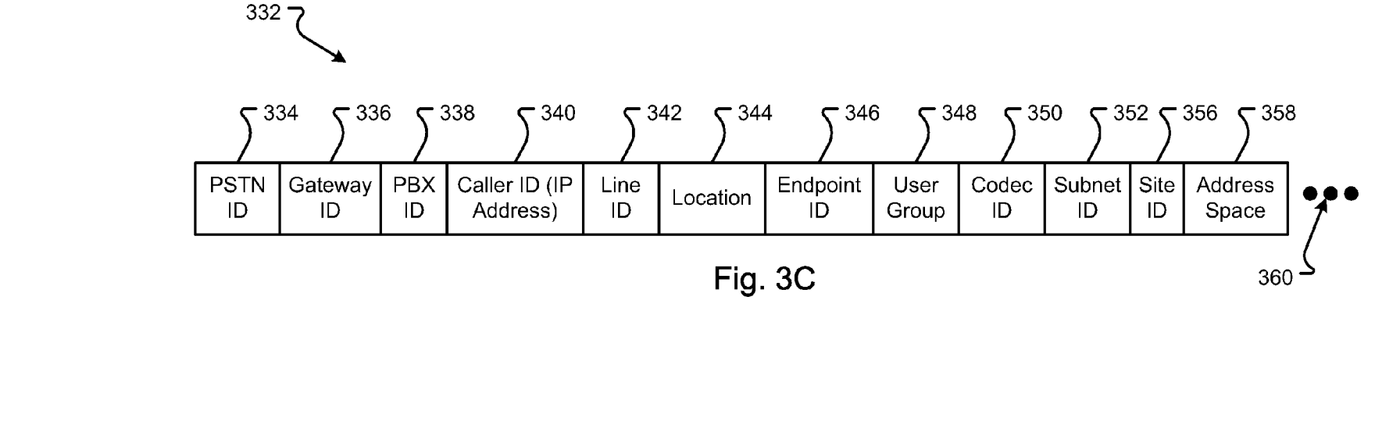

Embodiments of database 300 can store one or more items of information associated with historical quality and configuration characteristics as described hereinafter and as shown in FIGS. 3A, 3B, and 3C. A historical data data structure 302, as stored in a historical data database 214, is shown FIG. 3A. The historical data data structure 302 can include a conference identifier 304, conference quality measures 306, and/or conference configuration information 308. The historical data data structure 302 can include more or fewer items or data than those shown in FIG. 3A, as represented by ellipses 310. The conference identifier 304 can be any identifier that can uniquely identify the conference 204 in relation to all other conferences conducted by the conference engine 202 or the conference bridge 114. The conference identifier 304 can be a globally unique identifier (GUID), a security code for the conference 204, a telephone number for the conference 204, or some other identifier that is unique among conferences.

Conference quality measures 306 can be any measurement of quality of the conference 204. The conference quality measures 306 may be recorded once or several times during the duration of the conference 204. For example, the conference quality measures 306 may be measured periodically every minute during the conference 204 and stored such that the conference quality measures 306 have a date and time stamp and a series of quality measures, and have several iterations of these measures for each conference. In other embodiments, the conference quality measures 306 may be taken in response to an event, such as a complaint about the audio quality or a reconfiguration of the conference 204. The quality measures may also be recorded when a user signals that the quality of the conference is good. An embodiment of conference quality measures 306 is shown in FIG. 3B.

The conference configuration data 308 can include any information about the configuration of the conference 204. The configuration characteristics in the conference configuration data 308 can be recorded before the conference 204 begins, e.g., during the initial configuration of the conference 204, and then during the conference upon any change to the conference configuration. In other embodiments, the conference configuration may be stored periodically, for example, every minute. An example of conference configuration data 308 is shown in FIG. 3C.

An embodiment of a conference quality measures data structure 312 is shown in FIG. 3B. The conference quality measures data structure 312 may have more or fewer sections for storing conference quality measures than those shown in FIG. 3B, as represented by ellipses 330. The conference quality measures data structure 312 can include sections for delay 314, packet loss 316, jitter buffer statistics 318, echo monitoring 320, distortion 322, interface measures 324, gain control 326, and/or signal to noise ratio 328.

Delay 314 can be any measure of the delay or timing of a data packet or other signal sent from a transmitting communication endpoint 102 to a receiving communication endpoint 102 or sending to or receiving from a conference bridge 114 during a conference. The measurement of and the types of delay that can be measured are generally known in the art. Packet loss 316 can be any measure of the number or types of data packets sent during a conference 204 that are lost during communication. Generally, the measurement of packet loss is known in the art. Delay 314 and packet loss 316 are generally regarded as measures of the quality of a digital data transmission. Other measures for quality of a digital data transmission can be stored within the conference quality measures data structure 312.

Jitter buffer statistics 318 can be any measure of jitter within the conference signal. Jitter can generally mean the fluctuation of one or more parameters of a signal. For example, jitter can measure the fluctuation of the frequency, amplitude, phase, or other parameter of a signal. Echo monitoring 320 can be any measure of echo within a signal. Echo generally occurs when a microphone receives a signal already transmitted and broadcast through a speaker at a conference site. The measurement of echo monitoring is generally known in the art. Distortion 322 can measure the degradation of a parameter of a signal. For example, distortion 322 can measure the degradation of the frequency or amplitude of a signal. Distortion 332 and the measurement of distortion 322 are generally known in the art.

The interface measures 324 can record any measurement of quality at an interface. For example, the conference bridge 114 may interface with a gateway 108b. A separate measurement program or system, at the gateway 108b, may measure the quality of the conference using one or more of the quality measures already described or other quality measures known in the art. Those one or more measures may be stored within the interface measure section 324. As such, the conference quality measures 306 can have several sections of conference quality data measured at different points along the transmission path of the conference signal. These separate measurement points allow for the easier diagnosis of issues with conference quality.

The gain control section 326 can store measures of gain control. The measurement of gain and gain control 326 is generally known in the art. Gain control can be the measure of the amplitude of the signal and the loss of amplitude or change in the amplitude of the conference signal during transmission in the conference 204. Signal to noise ratio 328 can measure signal to noise as known in the art. Generally, during the transmission of the signal in a conference 204, interference or other types of electromagnetic processes can create noise in the conference signal. The signal to noise ratio 328 can measure the effects of those electromagnetic processes.

An embodiment of conference configuration information 322 is shown in FIG. 3C. The conference configuration information 322 can include more or fewer sections than those shown in FIG. 3C, as represented by ellipses 360. Each section can store information about the conference bridge 114 or one or more of the portions of the transmission path of the conference 204, as shown in FIG. 1. Some examples of information that may be stored in the conference configuration data structure 322 are a public switched telephone network (PSTN) identifier (ID) 334, a gateway identifier 336, a PBX identifier 338, a caller identifier or Internet Protocol (IP) address 340, a line identifier 342, a location 344, a communication endpoint 102 identifier 346, a user group 348, a coder or decoder identifier 350, a subnet identifier 352, a site identifier 356, and/or an address base 358. These different sections will be described briefly in turn.

The PSTN ID 334 can provide or store the ID, number, or some other information about the network 110 or one or more other networks that are used in the transmission path of the conference 204. The PSTN ID 334 can store not only an identifier but the type or other information about the PSTN such as the provider, the location, the type of equipment that may be used in the PSTN, etc. PSTNs and the identification thereof are known in the art.

The gateway ID 336 can identify the type and characteristics of one or more gateways in the transmission path of the conference 204. For example, a gateway ID 336 can store information about gateway 1 108a and/or gateway 2 108b. Again, similar to the PSTN ID 334, the gateway ID 336 can store an identity or information about the type and characteristics of the gateway 108. Gateways and the identification thereof are well known in the art.

The PBX ID 338 can store information about the PBX 106 used in the conference 204. The PBX ID 338 can store an identifier for the PBX and can store information about the configuration, type or operating configuration of the PBX 106. A caller ID 340 can store an identifier of the user or communication endpoint 102. For example, the caller ID can store a phone number for the communication endpoint 102 or an internal protocol (IP) address for the communication endpoint 102. Further, the caller ID 340 can store information about the type or configuration of the communication endpoint 102. The line ID 342 can store information about the line used in one or more of the PBX 106, the network 110, or some other connection in the transmission path shown in FIG. 1. Thus, the PBX 106 or the network 110 can have two or more lines used for communication, and the line ID 342 can identify the lines being used by the PBX 106 or the network 110.

The location 344 can store the location of one or more of the components within the transmission path shown in FIG. 1. For example, the location 344 can store the location of the PBX 106, the gateway 106, the LAN 112, or the network 110. Further, the location 344 may store the location of one or more of the communication endpoints 102 or the location of the conference bridge 114. The locations may be used to identify problems in certain geographical areas when communicating with certain sites in a conference 204. The endpoint identifier 346 can be similar to the caller identifier 340, in that the endpoint ID 346 can identify the communication endpoint 102. The communication endpoint ID 346 can also include information about the communication endpoint 102 and may provide the same, supplemental, or different information on than caller ID 340.

The user group 348 can store information about a logical grouping for one or more of the communication endpoints 102 or other components in the transmission path shown in FIG. 1. For example, during digital communications, a communication endpoint 102 may be organized into a group of other communication endpoints 102 at a site; this grouping information may be recorded in the user group 348. Thus, the user group information 348 can be used to identify problems with certain sites or groups of users that may be using similar technology or using similar systems when communicating in conferences 204.

One or more coders or decoders may be used during the transmission of information during a conference 204. The codec ID 350 can record an ID, type, other configuration information, or other characteristics of one or more codecs used in the conference transmission path shown in FIG. 1. The subnet ID 352 can store information about the logical organization of one or more of the components within a network 110 and/or transmission path. Thus, the subnet ID 352 can store the identifier or type of subnet being used in one or more networks 110 and/or transmission path for the one or more of the components shown in FIG. 1.

The site ID 356 is similar to the subnet ID 352 and can provide information about logical organization of one or more of the components within a network 110 and/or transmission path. Thus, the site ID 356 can record the site being used by one or more communication endpoints 102. For example, in a conference call between New York and London, the conference 204 would include two site IDs 356: a first ID for the New York site and a second ID for the London site. The address base 358 also can store information about the logical organization of the components within the network 110 and/or transmission path. The address base 358 can store the identifier, type, or other characteristics of the group of IP addresses used by one or more of the components in the transmission path shown in FIG. 1.

Figure 4:
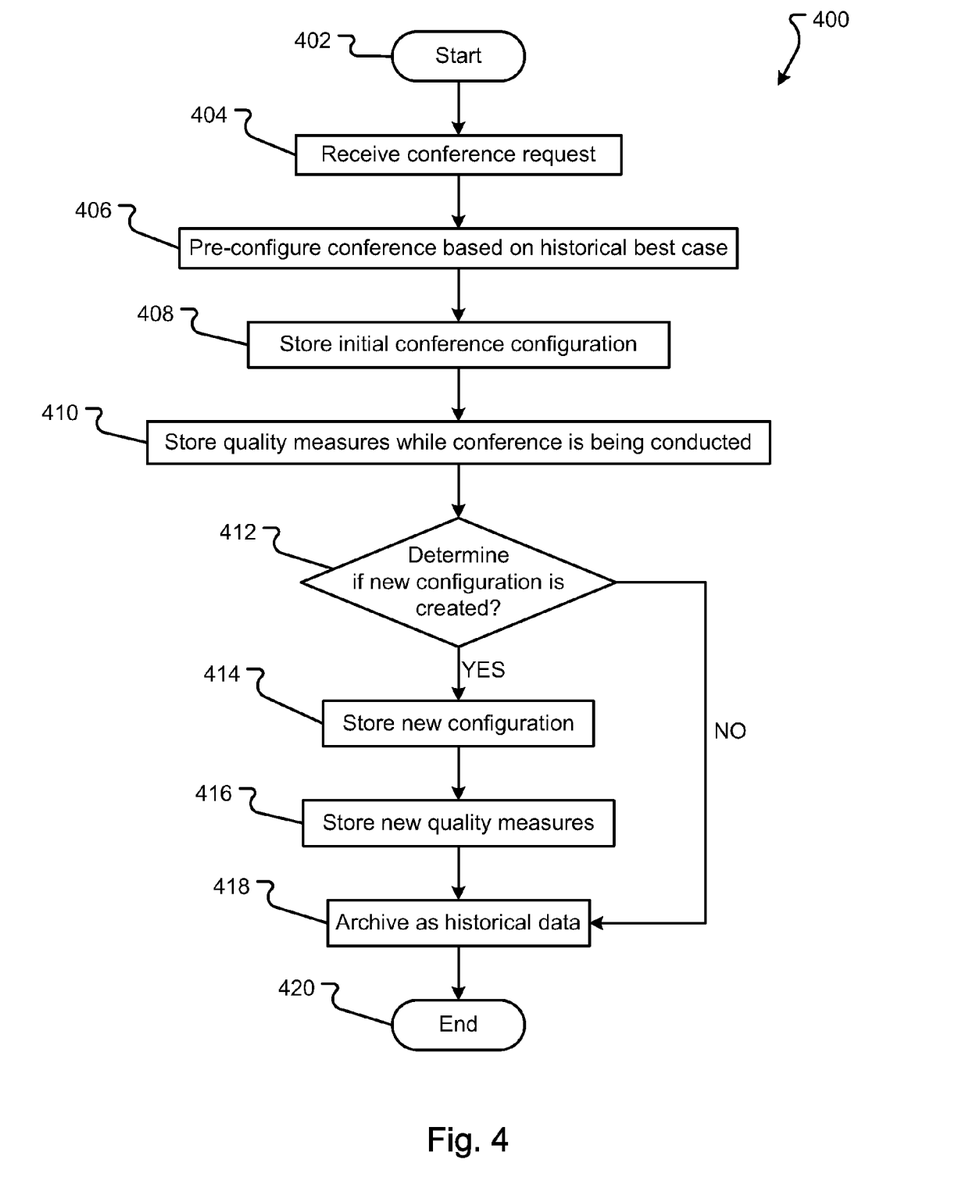
FIG. 4 is a flow diagram of an embodiment of a process for storing information about a conference.

An embodiment for method 400 for automatically storing information about a conference 204 is shown in FIG. 4. Generally, the method 400 begins with a start operation 402 and terminates with an end operation 420. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, data structures, user interfaces, etc. described in conjunction with FIGS. 1-3C.

A conference bridge 114 receives a conference request, in step 404. A communication endpoint 102 begins a conference 204 by sending a conference request to a conference bridge 114. The conference request generally includes information about the type or initial configuration of a conference 204 to be executed by a conference engine 202 within the conference bridge 114.

The conference engine 202, of the conference bridge 114, can initiate the conference 204 by accessing historical information through a data collection module 208 and/or a configuration module 212. The historical information stored in a historical database 214 can be used to pre-configure the conference 204 based on a historical best case, in step 406. In embodiments, the conference engine 202 may communicate with a configuration module 212 to receive the pre-configuration parameters for the conference 204. The configuration module 212 can access the historical data in the historical data database 214 or information in a best rule database 216 to determine, from past conferences with similar initial configurations, similar characteristics, and/or similar conference requests, which is the best configuration to begin the conference 204. The conference engine 202 may then pre-configure the conference 204 based on this determined best case pre-configuration.

The initial conference configuration may then be stored, in step 408. Thus, the conference engine 202 can send the final configuration for the initial set-up of the conference 204 to the data collection module 208, which can then store the initial conference configuration in the historical data database 214. This configuration information can be as shown in FIGS. 3A and 3C.

At some time thereinafter, the conference engine 202 begins to execute or conduct the conference 204 for one or more communication endpoints 102. As the conference 204 is being conducted, the conference engine 202 can provide quality measures to the data collection module 208 and/or the quality measurement module 210. In embodiments, the quality measurement module 210 can measure or record the quality measures, such as those quality measure described in conjunction with FIGS. 3A and 3B. The quality measurement module 210 may provide the measured quality parameters to the data collection module 208. The data collection module 208 can then store the quality measures while the conference is being conducted, in step 410.

In embodiments, the data collection module 208 stores the quality measures in the historical data database 214 and associates those quality measures with the configuration information already recorded. Further, the data collection module 208 may store a quality measure periodically or after every change in one or more of the quality measures. For example, the data collection module 208 may store one or more quality measures every minute during the conference 204. In other embodiments, the data collection module 208 will store the quality information if any change in the configuration of the conference 204 is made.

The conference engine 202 may change the configuration of the conference 204 during the conference 204. The change in the configuration may be made to improve quality measures or may be made because of a change in how the conference 201 is being conducted. For example, one or more additional communication endpoints 102 may be added or dropped from the conference 204. A new site may be added during the conference or some other type of change may be initiated by the users in the conference 204. The data collection module 208 or configuration module 212 can determine if a new configuration is created during a conference 204, in step 412. Here, the conference engine 202 may provide a consistent stream of information about the configuration of the conference 204 to the configuration module 212 and/or the data collection module 208. In other embodiments, the configuration module 212 or data collection module 208 can poll the conference engine 202 for information about a conference and compare the characteristics of the received information to past information already received about the conference 204. If the data collection module 208 or configuration module 212 determines that a new configuration is created, step 412 proceeds YES to step 414. However, if the data collection module 208 or configuration module 212 determine that no new configuration is created, step 412 can proceed NO to step 418.

In step 414, the configuration module 212 can store the new configuration information or provide the new configuration information to the data collection module 208 to store in the historical data database 214. As such, the data collection module 208 may record two or more configurations, similar to those shown in FIG. 3C, during a single conference 204. The two or more configurations may be stored with a single conference identifier 304 in the historical data database 214.

After the new configuration is created, the quality measurement module 210 may record or measure new quality characteristics 312 for the data collection module 208. The data collection module 208 may store these new quality measures in the historical data database 214, in step 416. The new quality measures may create new sets of quality measure data structures 312 in the historical data database 214 and associate those new sets of quality measure data structures 312 with the same conference identifier 304. The procedures for recording the configuration and quality measures continue until the conference engine 202 ends the conference 204. Upon ending the conference, the conference engine 202 sends information to the data collection module 208. The data collection module 208 may then archive the recorded data in the historical data database 214, in step 418. Thus, this recordation of the final information makes a historical record in the historical data database 214.

Figure 5:
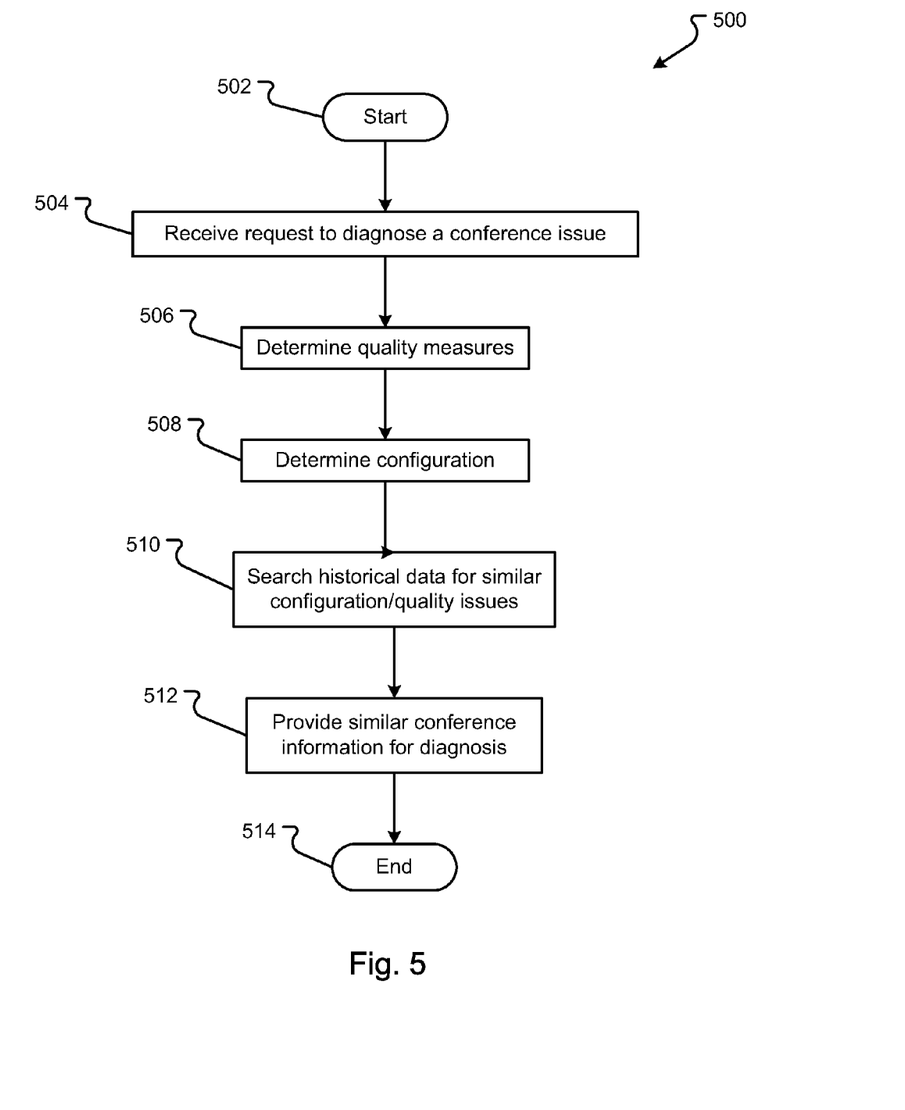
FIG. 5 is another flow diagram of an embodiment of a process for providing information related to a conference.

An embodiment of a method 500 for providing historical information to diagnose conference problems is shown in FIG. 5. Generally, the method 500 begins with a start operation 502 and terminates with an end operation 514. While a general order for the steps of the method 500 are shown in FIG. 5, the method 500 can include more or fewer steps or the order of the steps may be arranged differently than the method 500 shown in FIG. 5. The method 500 can be a set of computer-executable instructions executed by a computer system or processor and/or encoded or stored on a computer readable medium. Hereinafter, the method 500 shall be explained with reference to the systems, components, modules, data structures, user interfaces, etc. described in conjunction with FIGS. 1-4.

The conference engine 202 can receive a request to diagnose a conference 204, in step 504. The request can be received from a communication endpoint 102 during a conference 204. The request can be a signal that there is an issue with the configuration or signal quality, whether audio, video, or other signal, with the conference 204. The conference engine 202 may send the request to diagnose the conference 204 to the data collection module 208.

The data collection module 208 can determine quality measures currently being recorded during the conference 204, in step 506. The data collection module 208 may request current quality measures from the quality measurement module 210 or may retrieve the current quality measures from the conference quality measures data structure 312 stored in the historical data database 214.

The data collection module 208 may then determine the configuration of the conference 204, in step 508. In embodiments, the data collection module 208 requests a configuration from the configuration module 212. In other embodiments, the data collection module may request the current configuration from the conference engine 202.

To determine the cause of the problem in the conference 202 or to provide pertinent data about the conference 204, the data collection module 208 may then search historical data in the historical data database 214 for similar configuration and/or quality issues, in step 510. The search of the historical data database 214 may search one or more quality characteristics in the quality measurement data structure 312 or one or more like configuration characteristics as stored in the configuration data structure 332. The data collection module 208 may then make a determination of the similarity or a confidence interval for the likeness of the conference quality measures 213 and/or the configuration 332 between the historical data and the current conference 204. Upon determining the most similar conference and/or quality measures in the historical data, the data collection module 208 may provide that historical information to a user or administrator, in step 512. The data collection module 208 can provide the similar conference information in the historical data, for help in diagnosing the issues with current conference 204, to the conference engine 202, which then may broadcast or provide that information to one or more communication endpoints 102 that are currently engaged in the conference 204.

Figure 6:
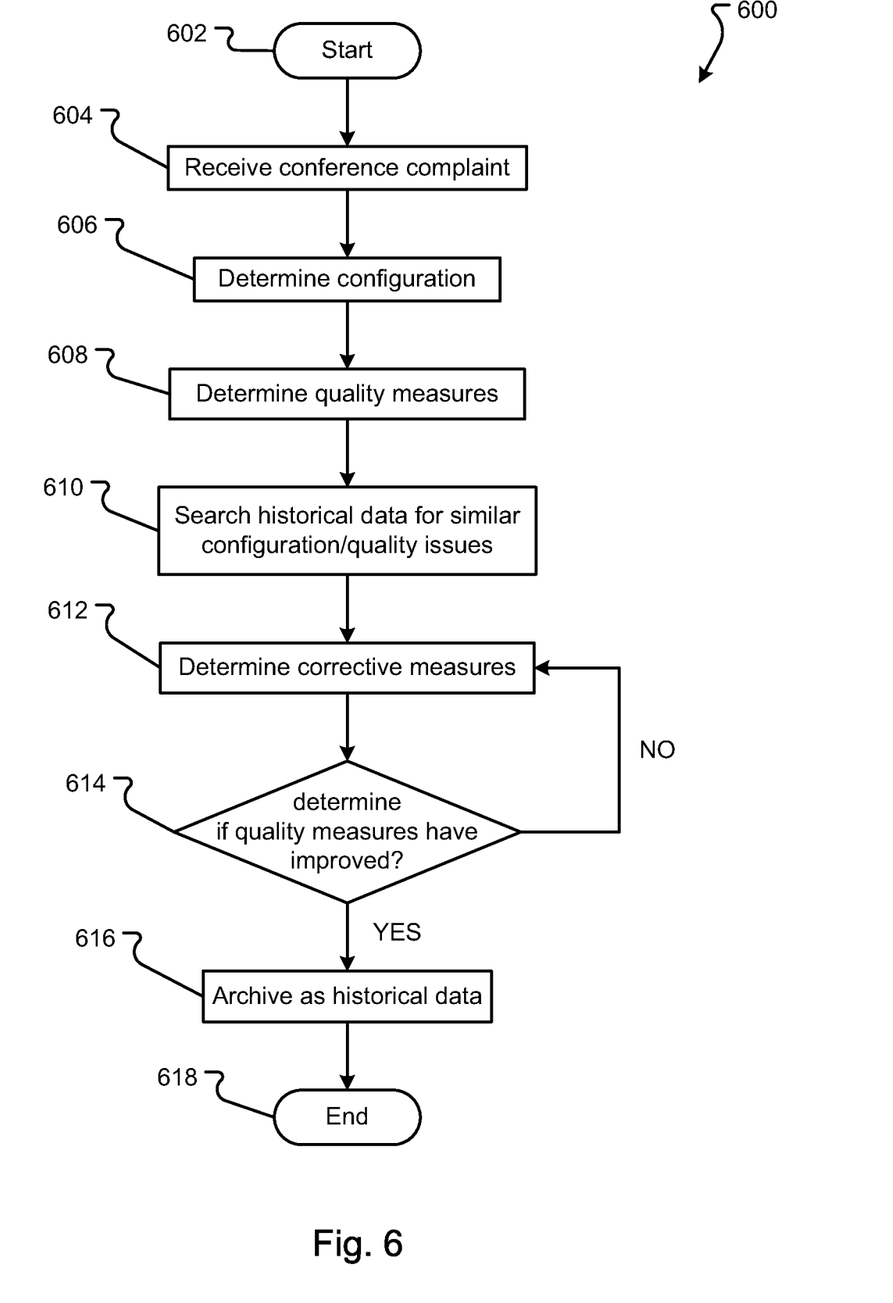
FIG. 6 is another flow diagram of an embodiment of a process for diagnosing and correcting quality problems associated with a conference.

An embodiment of a method 600 for automatically reconfiguring a conference 204 is shown in FIG. 6. Generally, the method 600 begins with a start operation 602 and terminates with an end operation 618. While a general order for the steps of the method 600 are shown in FIG. 6, the method 600 can include more or fewer steps or the order of the steps may be arranged differently than the method 600 shown in FIG. 6. The method 600 can be a set of computer-executable instructions executed by a computer system or processor and/or encoded or stored on a computer readable medium. Hereinafter, the method 600 shall be explained with reference to the systems, components, modules, data structures, user interfaces, etc. described in conjunction with FIGS. 1-5.

Similar to the method 500, the conference engine 202 can receive a complaint about the quality of the signal or the performance of a conference 204, in step 604. Here, the conference engine 202 may receive the complaint by input by one or more communication endpoints 102 that are engaged in the conference 204. The conference engine 202 can receive this complaint and send the complaint to the data collection module 208.

The data collection module 208 may then determine the configuration of the conference 204, in step 606. The data collection module 208 may request the current configuration from the conference engine 202 or may access conference configuration information in the conference configuration data structure 332. Further, the data collection module 208 may determine the current quality measures, in step 608. Here, the data collection module 208 may request the current quality measures from the quality measurement module 210 or may access the conference quality measures in the conference quality measures data structure 312 stored in the historical data database 214.

Also similar to method 500 described in conjunction with FIG. 5, the data collection module 208 may then access the historical data database 214 to search the historical data for similar conferences with similar configurations and/or quality issues, in step 610. Thus, the data collection module 208 may compare one or more data items associated with the current conference in the conference quality measures data structure 312 or in the conference configuration information 332 with data items associated with historical data in other conference quality measures data structure 312 or other conference configuration data structure 332. Various algorithms can be used to determine a likeness of the configuration or quality to the past historical data. For example, certain data may be rated more important than other data, and, as such, the data collection module 208 may attempt to find the nearest comparison with those more important data points. In other embodiments, the data collection module 208 may use a form of regression analysis or other methodical algorithm that can produce a confidence interval for how closely related the quality conference measures or the conference configuration are to the historical data.

Upon determining the historical data that is most pertinent to the current complaint, the data collection module 208 may send the information to the conference configuration module 212. Unlike method 500 described in conjunction with FIG. 5, the conference module 212 may automatically adjust the configuration of the conference 204 rather than simply provide information to a user for the user to adjust the conference 204. Here, the conference configuration module 212 can determine corrective measures, in step 612. Corrective measures can be several different types of automated adjustments that can be made to the conference 204.

In one embodiment, the conference configuration module 212 may access a best rules database 216 to determine the best rules for modifying the conference configuration when encountering the type of quality problems in the current conference 204. These best rules may be based on the historical data 214 and/or the information received from the data collection module 208. A best rule may direct, for example, if a certain quality measure is out of normal range, to adjust a certain part of the configuration to correct that problem. The best rules may be in a hierarchal form where the first rule is completed, and then, if that does not work or newly read quality measures do not improve, the configuration module 212 executes a subordinate rule until the quality problem is eliminated.

In other embodiments, the configuration module 212 may use a type of artificial intelligence to learn from making minor changes to the conference configuration. Thus, the conference configuration module may adjust one of the conference configuration data points shown in the conference configuration data structure 332 and then determine a change to the quality measures stored in the conference quality measures data structure 312. If an improvement is made, the conference configuration module 212 may continue to adjust that one parameter or may select other parameters to adjust. If the conference obtains a quality that is acceptable to the user or within a range considered to be "good", then the conference configuration module 212 may stop the adjustments. These types of minor adjustments may be used then to change or modify the best rules database 216, thus allowing the configuration module 212 to learn from the adjustments.

As corrective measures are made, the configuration module 212 can receive new conference quality measures from the quality measurement module 210 to determine if the quality measures have improved, in step 614. The conference configuration module 212 can determine if the quality measures are within a certain range specified by a user or administrator or may ask the users if the conference has improved they wish to accept the changes. Thus, there are several methods for determining if the quality measures have improved contemplated by the embodiments presented herein. If the quality measures have improved, step 614 proceeds YES to step 16. If the quality measures have not improved, step 614 proceeds NO to return to step 612 to continue to enact corrective measures. Once the quality measures have improved and the configuration is accepted, the configuration module 212 may send the configuration information back to the data collection module 208. The data collection module 208 may then store the new configuration information and the new quality measures within the historical data database 214, thus, creating more or addendums to the conference quality measures data structure 312 and the conference configuration data structure 322.

FIG. 7 illustrates a block diagram of a computing environment 700 that may function as system or environment for the embodiments described herein. The system 700 includes one or more user computers 705, 710, and 715. The user computers 705, 710, and 715 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network (e.g., the network 720 described below) and/or displaying and navigating web pages or other types of electronic documents. Although the exemplary system 700 is shown with three user computers, any number of user computers may be supported.

System 700 further includes a network 720. The network 720 can be any type of network familiar to those skilled in the art that can support data communications using any of a variety of commercially-available protocols, including, without limitation, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 700 may also include one or more server computers 725, 730. One server may be a web server 725, which may be used to process requests for web pages or other electronic documents from user computers 705, 710, and 715. The web server can be running an operating system including any of those discussed above, as well as any commercially-available server operating systems. The web server 725 can also run a variety of server applications, including HTTP servers, FTP servers, CGI servers, database servers, Java servers, and the like. In some instances, the web server 725 may publish operations available operations as one or more web services.

The system 700 may also include one or more file and or/application servers 730, which can, in addition to an operating system, include one or more applications accessible by a client running on one or more of the user computers 705, 710, 715. The server(s) 730 may be one or more general purpose computers capable of executing programs or scripts in response to the user computers 705, 710 and 715. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 705 and can forward the web page requests and/or input data to the web application server 730. In further embodiments, the server 730 may function as a file server. Although for ease of description, FIG. 5 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, file server 725 and/or application server 730 may function as servers or other systems described herein.

The system 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i™, that is adapted to store, update, and retrieve data in response to SQL-formatted commands. Database 735 may be the same or similar to the database used herein.

FIG. 8 illustrates one embodiment of a computer system 800 upon which servers or other systems described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage device 820. By way of example, storage device(s) 820 may be disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 835, which can include a DSP, a special-purpose processor and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 820 and/or any other computer described above with respect to the system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850, such as program code implementing the servers or devices described herein. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the embodiments have been described in detail herein, it is to be understood that the inventive concepts may be otherwise variously embodied and employed, and that the appended claims are intended to be construed to include such variations, except as limited by the prior art.

What is claimed is:

1. A method for storing conference information, comprising:
    searching historical data in a historical data database for a conference having a conference configuration similar to that in a conference request for a first conference;
    searching the historical data in the historical data database for a conference configuration having a good audio quality;
    establishing an initial conference configuration based on the conference configuration similar to the conference request and the conference configuration having good audio quality;
    a conference bridge storing the initial conference configuration for the first conference;
    the conference bridge conducting the first conference;
    while the first conference is being conducted, the conference bridge storing one or more quality measures associated with the first conference in the historical database, wherein the one or more quality measures in the historical database comprises at least one quality measure determined for a grouping of users that are using similar technology or similar systems when communicating in the first conference; and
    after the first conference is completed, archiving the conference configuration and the one or more quality measures as historical data.

2. The method as defined in claim 1, wherein the conference configuration includes the initial conference configuration and one or more changes to the conference configuration that occur during the conference.

3. The method as defined in claim 2, wherein the one or more changes to the conference configuration occur when the conference configuration is changed to address a problem with a quality measure that is recorded during the first conference.

4. The method as defined in claim 2, wherein the initial conference configuration is created in response to receiving a conference request from a communication endpoint.

5. The method of claim 4, wherein the conference request from the communication endpoint comprises a conference identifier, the initial conference configuration is stored with the conference identifier, and a second conference configuration is recorded during the conference using the conference identifier, wherein the initial configuration and the second conference configuration are stored in the historical database.

6. The method as defined in claim 4, wherein the conference configuration and the one or more quality measures are retrieved to establish a second initial conference configuration for a second conference.

7. The method of claim 1, wherein the logical grouping of users is used to identify a problem at a certain site."

8. The method as defined in claim 1, wherein the one or more quality measures include one or more of the group comprising a delay, a packet loss, a jitter buffer statistic, a measurement of echo monitoring, a distortion, an interface measure, a gain control measure, and a signal to noise ratio measure.

9. The method as defined in claim 1, further comprising:
    determining if a new conference configuration to the first conference is created;
    when the new conference configuration to the first conference is created, store the new conference configuration;
    when the new conference configuration to the first conference is created, store one or more new quality measures associated with the new conference configuration; and
    when the first conference has ended, archiving the new conference configuration and the one or more new quality measures associated with the new conference configuration and the one or more quality measures.

10. The method as defined in claim 9, wherein the new conference configuration is created to address a problem with one or more of the quality measures.

11. The method as defined in claim 10, further comprising:
    receiving a complaint about a quality of the first conference from a communication endpoint involved in the first conference;
    determining the conference configuration;
    determining the one or more quality measures;
    searching historical data in a historical data database for a second conference with a similar conference configuration or a similar quality measure;
    based on the historical data, determining a corrective measure for the quality;
    conducting the corrective measure;
    determining if the corrective measure improved one or more of the quality measures;
    if the corrective measure improved one or more of the quality measures, storing the new conference configuration and one or more new quality measures; and
    if the corrective measure does not improve one or more of the quality measures, determining a second corrective measure.

12. A communication network comprising:
    two or more communication endpoints;
    one or more conference bridges, each conference bridge in communication with at least one of the two or more communication endpoints, each conference bridge comprising:
        a conference engine operable to conduct a first conference;
        a data collection module operable to:
            receive a conference configuration for the first conference;
            receive one or more quality measures associated with the first conference, wherein the one or more quality measures in the historical database comprises at least one quality measure determined for a grouping of users that are using similar technology or similar systems when communicating in the first conference;

determine that the conference configuration has a good audio quality;
store the conference configuration and the one or more quality measures in a historical data database;
a quality measurement module operable to:
determine the one or more quality measures associated with the first conference;
provide the one or more quality measures to the data collection module;
a configuration module operable to:
determine the conference configuration for the first conference;
provide the conference configuration to the data collection module; and
the historical data database operable to store the conference configuration and the one or more quality measures associated with the first conference and at least one other conference configuration and one or more other quality measures associated with at least a second conference.

13. The communication network as defined in claim 12, further comprising:
a conference engine operable to:
receive a conference request for the first conference;
conduct the first conference;
wherein the configuration module is further operable to:
receive the conference request from the conference engine;
receive historical data from the historical data database similar to a conference configuration requested in the conference request; and
based on the historical data, determine an initial conference configuration.

14. The communication network as defined in claim 13, wherein the conference engine is further operable to receive a complaint about a quality of the first conference, wherein the data collection module is further operable to:
receive the complaint from the conference engine;
receive one or more quality measures from the quality measurement module;
receive the conference configuration from the configuration module;
search historical data in the historical data database for the second conference which has a similar quality measure or a similar conference configuration; and
retrieve the historical data from the historical data database.

15. The communication network as defined in claim 14, wherein the data collection module is further operable to provide the historical data to the configuration module, wherein the configuration module is further operable to:
based on the historical data determine a corrective measure to address the complaint; and
create a new conference configuration for the first conference based on the corrective measure.

16. The communication network as defined in claim 14, wherein the data collection module is further operable to provide the historical data to a user.

17. The communication network as defined in claim 12, further comprising a best rules database operable to store one or more rules for correcting problems with conference quality.

18. The communication network as defined in claim 12, wherein the historical data database includes two or more historical data data structures, wherein each historical data data structure is operable to store quality measures and conference configuration information associated with a conference.

19. A computer program product including computer executable instructions stored onto a tangible, non-transitory computer readable medium, which, when executed by a processor, causes the processor to perform a method for automatically correcting an audio quality problem with a teleconference, the instructions comprising:
instructions to receive a conference request to conduct a first conference;
instructions to store a conference configuration for the first conference;
instructions to conduct the first conference;
while the first conference is being conducted, instructions to store one or more quality measures associated with the first conference in the historical database, wherein the one or more quality measures in the historical database comprises at least one quality measure determined for a grouping of users that are using similar technology or similar systems when communicating in the first conference; and
during the first conference, instructions to receive a complaint about the audio quality problem from a communication endpoint;
instructions to determine the conference configuration;
instructions to determine the one or more quality measures associated with the audio quality problem;
instructions to search historical data in a historical data database for a second conference with a similar conference configuration and a similar audio quality problem;
instructions to determine a second conference configuration used to address the similar audio quality problem in the second conference;
based on the second conference configuration in the second conference, instructions to determine a corrective measure to adjust the conference configuration for the first conference;
instructions to conduct the corrective measure;
instructions to determine if the corrective measure improved the one or more of the quality measures associated with the audio quality problem;
if the corrective measure improved the quality measures associated with the audio quality problem, instructions to store the adjusted conference configuration and one or more new quality measures; and
if the corrective measure does not improve the quality measures associated with the audio quality problem, instructions to determine a second corrective measure.

20. The computer program product as defined in claim 19, wherein if the corrective measure does not improve the quality measures associated with the audio quality problem, instructions to provide the historical information to a user.

* * * * *

UNITED STATES PATENT AND TRADEMARK OFFICE
CERTIFICATE OF CORRECTION

PATENT NO. : 8,625,767 B2  Page 1 of 1
APPLICATION NO. : 12/894478
DATED : January 7, 2014
INVENTOR(S) : Byrne et al.

It is certified that error appears in the above-identified patent and that said Letters Patent is hereby corrected as shown below:

In the Claims

Claim 7, Column 18, line 8, please delete the """ after the word "site".

Signed and Sealed this
Twenty-seventh Day of May, 2014

Michelle K. Lee
*Deputy Director of the United States Patent and Trademark Office*